United States Patent
Basham

(10) Patent No.: US 9,254,237 B2
(45) Date of Patent: Feb. 9, 2016

(54) SHOCK ABSORBER INSERT FOR A WALKING AID

(75) Inventor: Marshall Aaron Vaughn Basham, Auckland Central (NZ)

(73) Assignee: Auckland Mobility Devices Limited (NZ)

( * ) Notice: Subject to any disclaimer, the term of this patent is extended or adjusted under 35 U.S.C. 154(b) by 825 days.

(21) Appl. No.: 13/078,515

(22) Filed: Apr. 1, 2011

(65) Prior Publication Data

US 2011/0209733 A1 Sep. 1, 2011

(51) Int. Cl.
| | |
|---|---|
| A61H 3/00 | (2006.01) |
| F16F 1/44 | (2006.01) |
| A61H 3/02 | (2006.01) |
| A45B 3/00 | (2006.01) |
| A45B 9/00 | (2006.01) |
| A45B 9/04 | (2006.01) |
| F16F 7/00 | (2006.01) |

(52) U.S. Cl.
CPC ................ *A61H 3/0277* (2013.01); *A45B 3/00* (2013.01); *A45B 9/00* (2013.01); *A45B 9/04* (2013.01); *F16F 1/44* (2013.01); *F16F 7/00* (2013.01); *A45B 2009/007* (2013.01)

(58) Field of Classification Search
USPC .................... 135/82; 403/378, 379.2; 411/530
See application file for complete search history.

(56) References Cited

U.S. PATENT DOCUMENTS

| | | | |
|---|---|---|---|
| 1,336,844 A * | 4/1920 | Klousnitzer ................... 135/82 |
| 2,397,499 A * | 4/1946 | McGowan ..................... 135/82 |
| 2,398,534 A * | 4/1946 | Klausnitzer et al. ............ 135/82 |
| 2,888,022 A * | 5/1959 | Fanning .......................... 135/82 |
| 2,926,033 A * | 2/1960 | Zarrillo ......................... 403/326 |
| 3,342,273 A * | 9/1967 | Crane ....................... 416/204 R |
| 4,244,602 A * | 1/1981 | Allsop et al. .................. 280/821 |
| 5,094,424 A * | 3/1992 | Hartway ....................... 248/600 |
| 6,055,998 A | 5/2000 | Bader |
| 6,286,529 B1 * | 9/2001 | Olivera ........................... 135/82 |
| 6,898,824 B2 * | 5/2005 | Zaltron ........................... 16/430 |
| 7,025,072 B2 * | 4/2006 | McGrath ......................... 135/75 |
| 7,229,101 B2 | 6/2007 | Lenhart |
| 7,306,275 B2 * | 12/2007 | Kalous ......................... 296/1.07 |
| 7,395,829 B2 | 7/2008 | Chapman |
| 7,481,233 B2 * | 1/2009 | Park ................................ 135/82 |
| 2001/0027802 A1 | 10/2001 | McGrath |
| 2002/0063369 A1 * | 5/2002 | Huang .......................... 267/153 |
| 2005/0129456 A1 | 6/2005 | Van Der Sluis |
| 2010/0170548 A1 | 7/2010 | Lenhart |

* cited by examiner

*Primary Examiner* — Noah C Hawk
(74) *Attorney, Agent, or Firm* — Tarolli, Sundheim, Covell & Tummino LLP

(57) ABSTRACT

The present invention relates to shock absorber insert for retro fitment into the body of an existing walking aid, such as a crutch, to dampen the impact force between the walking aid and a ground surface. Known shock absorbing walking aids can be relatively expensive to manufacture, heavy to use and do not provide for adjustment of the shock absorber. The shock absorber insert (1) of the present invention comprises a piston cylinder (11) with an end wall (11A); a piston (5) which moves axially within the piston cylinder (11) and a damper (10) located on a piston rod (9) and abut the end wall (11A) to reduce the speed of movement of the piston rod (9) within the piston cylinder (11). The shock absorber insert is either mid mounted between an upper (2) and lower (3) shaft or bottom mounted into a lower end of the lower (3) shaft.

16 Claims, 8 Drawing Sheets

SHOCK ABSORBER INSERT FOR A WALKING AID

TECHNICAL FIELD

This invention relates to a shock absorber insert for a walking aid. More particularly, this invention relates to a shock absorber insert configured for retro fitment by insertion into the body of an existing walking aid such as a crutch to dampen the impact force between the walking aid and a ground surface.

BACKGROUND ART

The use of walking aids such as walking sticks, elbow crutches or axilla (underarm) crutches by users with short or long term leg injury is commonplace. As the tip of the walking aid is placed on a ground surface during walking a large load is transmitted to the upper body (at the hands, wrists, arms, shoulder, back, neck or joints such as elbow joints or shoulder joints), which can result in upper body pain and/or fatigue which in turn may lead to crutch palsy, aneurysms, thrombosis or other serious conditions.

In an effort to damp the impact force resulting from the load transmitted to the user during walking, walking aids incorporating shock absorbers have been developed. These known shock absorbing crutches include dedicated spring-loaded crutches where the shock absorber is permanently integrated into the crutch body and which requires the user to purchase and use the spring-loaded crutch in preference to the traditional rigid crutch.

The disadvantages associated with the use of dedicated shock absorbing crutches include the extra expense of purchasing the new crutch, the increased weight of the crutch which can affect manoeuvrability and the inconvenience of using a shock absorbing crutch on ground surfaces which do not require shock absorption and which can lead to instability for the user.

More recently, conversion kits have been developed to fit to existing crutches.

U.S. Pat. No. 7,395,829 titled "Shock Absorber Crutch and Shock Absorber Kit" discloses a spring loaded shock absorber which clamps onto the lower end of the body of the crutch.

U.S. Pat. No. 6,055,998 titled "Shock Absorbing Fixture" discloses a spring loaded shock absorber which is removably fitted into the lower end of the body of the crutch.

US2005/0129456 titled "Crutch Apparatus and Method" discloses the use of a gel shock insert (rather than a spring) located between a fixed tube stop and a plug located in a slide tube slidingly engaged with the fixed tube.

However, the shock absorbers disclosed in the documents outlined above suffer from one or more of the following disadvantages:
- Attachment of the shock absorber to the body of the crutch can require the use of tools and therefore be inconvenient to convert between a shock absorbing crutch and a rigid crutch;
- Multiple individual parts can make fitment of the crutch with the shock absorber inconvenient;
- Attachment of the shock absorber to the body of the crutch can affect the integrity of the body of the crutch and therefore present a danger of failure of the crutch during use; and
- The lack of adjustability of the shock absorber can make use of the shock absorbing crutch limited over different surfaces or with users of different weight.

It is an object of the present invention to address the foregoing problems or at least to provide the public with a useful choice.

Further aspects and advantages of the present invention will become apparent from the ensuing description which is given by way of example only.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein; this reference does not constitute an admission that any of these documents form part of the common general knowledge in the art, in Australia or in any other country.

It is acknowledged that the term 'comprising' may, under varying jurisdictions, be attributed with either, an exclusive or an inclusive meaning. For the purpose of this specification, and unless otherwise noted, the term 'comprising' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

DISCLOSURE OF INVENTION

According to a first aspect of the present invention there is provided a shock absorber insert for a walking aid comprising:
- a piston cylinder comprising an abutment surface;
- a piston rod configured to move axially within the piston cylinder; and
- a damper configured to be located on the piston rod and abut the abutment surface to reduce the speed of movement of the piston rod within the piston cylinder wherein the shock absorber insert is configured to be removably fitted into an internal space of at least one support member of the walking aid.

It is acknowledged for the purposes of the specification that the term "walking aid" means an elbow crutch, underarm (axilla) crutch, walking stick, cane, ski pole, walking frame, prosthetic leg, prosthetic foot or the like.

Preferably, the piston cylinder and piston rod are configured to enable the damper to be interchangeable with a similar damper of different shore hardness.

More preferably, a portion of the piston rod is located within the piston cylinder with an attachment means.

More preferably still, the attachment means is a clip configured to be inserted through an aperture in an end of the piston rod which projects through an end wall of the piston cylinder after insertion of the piston rod through the abutment surface of the piston cylinder.

Preferably, the clip is an R-clip. Preferably, the damper is manufactured from a moulded material. More preferably, the damper is manufactured from polyurethane.

Preferably, the shock absorber insert is configured to be removably fitted into a lower end of the support member which contacts a ground surface during use of the walking aid.

More preferably, the shock absorber insert is configured to be friction fitted within a lower end of the support member.

More preferably, the shock absorber insert also comprises a foot which is configured to contact a ground surface during use of the walking aid and be removably fitted on an end of the piston rod extending from the piston cylinder.

Preferably, the shock absorber insert is configured to be removably fitted between an upper and lower support member of the walking aid.

More preferably, the piston rod is configured to be reversibly fitted to the upper support member via a nib-spring locating in at least one aperture of an upper portion of the piston rod and at least one aperture of the upper support member.

According to another aspect of the present invention there is provided a kit which can be readily assembled into a shock absorber insert for a walking aid comprising:
- a piston cylinder comprising an abutment surface;
- a piston rod configured to move axially within the piston cylinder;
- at least one damper, each damper configured to be located on the piston rod and abut the abutment surface and reduce the speed of movement of the piston rod within the piston cylinder;

wherein the shock absorber insert is configured to be removably fitted into an internal space of at least one support member of the walking aid.

Preferably, the damper is interchangeable with a similar damper of different shore hardness.

Preferably, the kit also comprises an attachment means configured to locate the piston rod within the piston cylinder.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
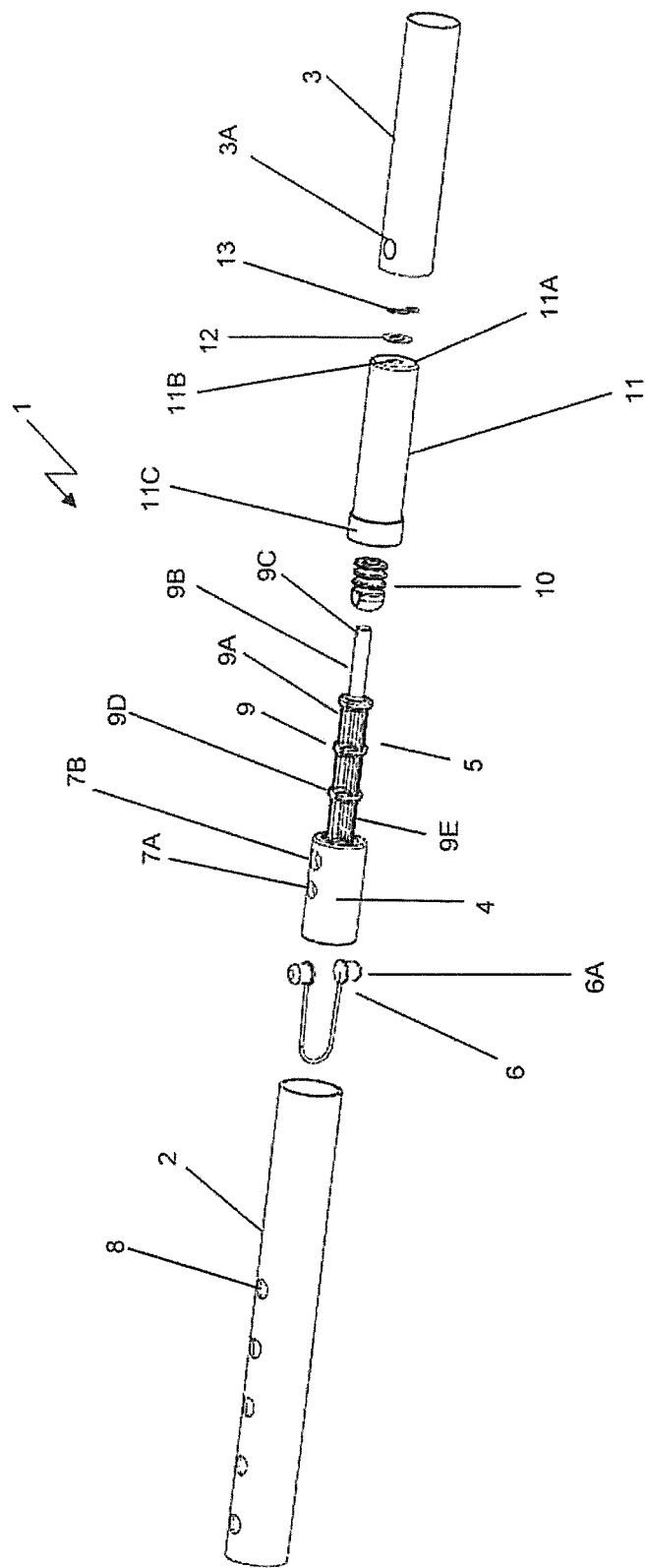
FIG. 1 shows an exploded view of a first preferred embodiment of the present invention in the form of a shock absorber insert for a walking aid.
Figure 2:
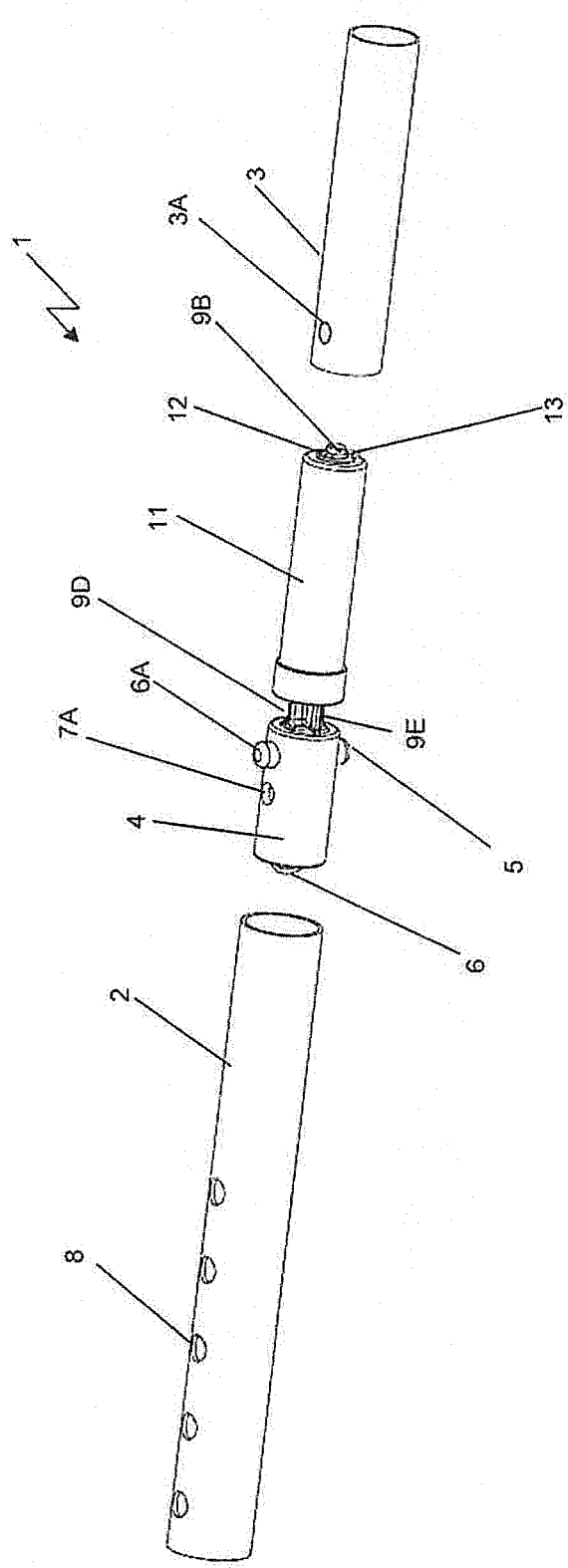
FIG. 2 shows a side perspective view of the embodiment shown in FIG. 1 assembled.

Referring to FIGS. 1 and 2 a preferred form of the invention in the form of a shock absorber insert for a walking aid in the form of an aluminium crutch is generally indicated by arrow 1.

FIG. 1 shows the component parts of the shock absorber insert 1 in relation to an upper 2 and lower 3 support member shaft of an aluminium crutch. The shock absorber insert 1 is configured to be mid-mounted in the crutch. The head 4 of a piston 5 is configured to be removably fitted into and retained in the upper 2 shaft via a flexible retaining nib-spring 6 which locates the nibs 6A in one of lower 7A or higher 7B spaced holes in the piston head 4 and one of spaced holes 8 in the upper 2 shaft. The two spaced holes 7A, B are different diameters to accommodate different sizes of nib-spring 6. The height of the shock absorber insert 1 can be altered relative to the upper shaft 2 by positioning the nib-spring in different spaced holes 8.

Figure 5:
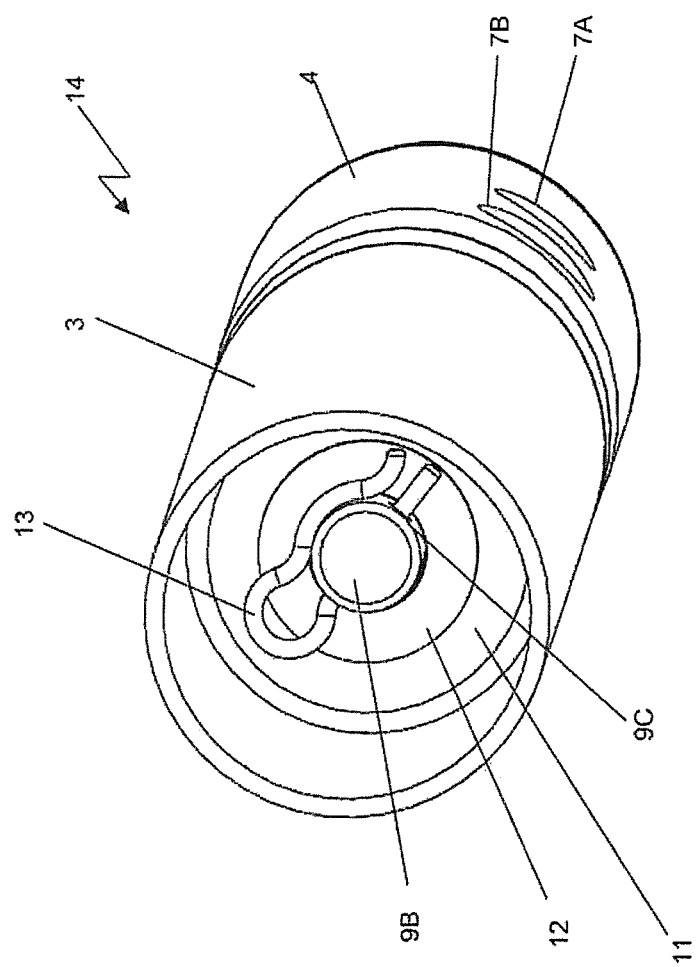
FIG. 5 shows an end perspective view of the embodiment shown in FIG. 3.

The piston 5 also includes a rod 9 consisting of upper rod portion 9A and lower rod portion 9B of smaller diameter. A damper 10 is located on the lower rod portion 9B and held in place by abutting the upper rod portion 9A and an abutment surface of the cylinder sleeve 11 in the form of an end wall 11A after insertion of the lower rod portion 9B into the cylinder sleeve 11. The end of the lower rod portion 9B extending through an aperture 11B in the end wall 11A is attached to the cylinder sleeve 11 using a washer 12 and attachment means int eh form of an R-clip 13, made of steel wire, which inserts through an aperture 9C in the end of the lower rod portion 9B (best seen in FIG. 5). A person skilled in the art would appreciate that other methods of attachment of the lower rod portion 9B within the cylinder sleeve 11 could be used without departing from the scope of the present invention such as a circlip (not shown) made of thin sheet spring steel. The rod 9 is therefore configured to move axially within the piston cylinder 11. The damper 10 reduces the speed of movement of the rod 9 within the piston cylinder 11. The cylinder sleeve 11 is located in side the lower shaft 3 of the crutch by frictional fit which abuts an enlarged head portion 11C of the cylinder sleeve 11.

Flattened surfaces 9D on the upper rod portion 9A locate the rod 9 inside corresponding location surfaces (not shown) inside the cylinder sleeve 11 in a particular orientation so that the nib spring 6 can be more easily located into the spaced holes 8 in the upper shaft 2 (after location of the nib spring 6 in the piston head 4) by preventing the piston head 4 turning relative to the upper shaft 2 during insertion. A crutch user may change the height of the crutch several times in one outing depending on the fatigue level of their upper body and/or different changing terrain. Profiled surfaces 9E on the upper rod portion 9A decrease material costs over an equivalent solid upper rod portion 9A and decrease cooling time inside the injection moulding machine during manufacture of the piston 5 as a result of the injection moulding coolant having more surface area on the upper rod portion 9A to cool and thereby increase speed of production and decrease production costs.

Flattened surfaces (not shown) inside the piston head 4 provide reinforcement via improved resistance to loads, compression and tension. The flattened surfaces also help to align the nibs 6A of the nib spring 6 during assembly of the shock absorber insert 1.

Figure 3:
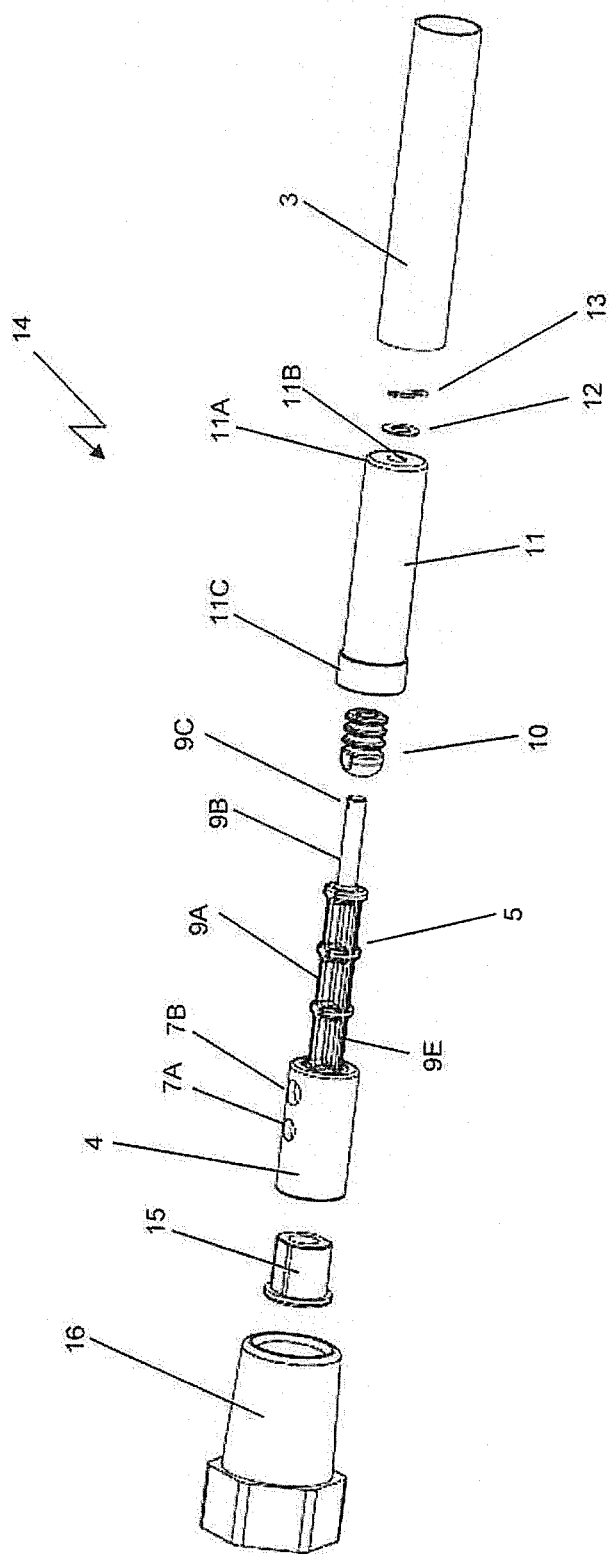
FIG. 3 shows an exploded view of a second preferred embodiment of the present invention in the form of a shock absorber insert for a walking aid.
Figure 4:
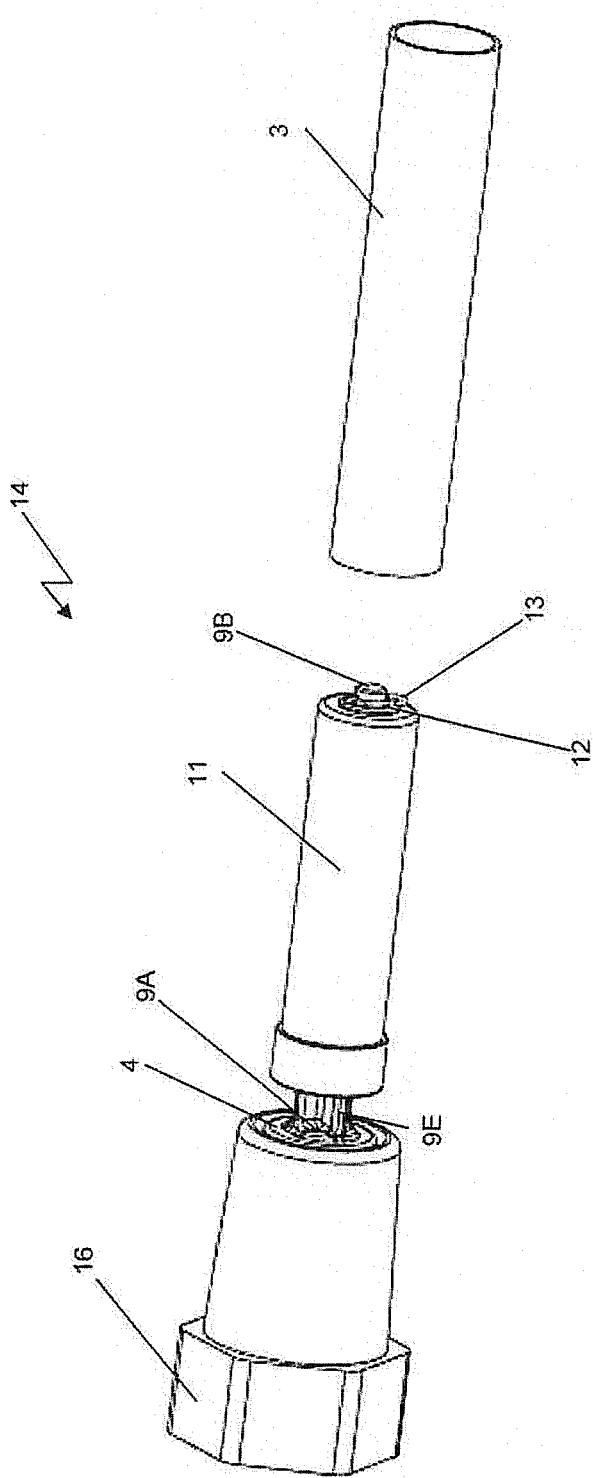
FIG. 4 shows a side perspective view of the embodiment shown in FIG. 3 assembled.

Another preferred form of the invention is generally indicated by arrow 14 in FIGS. 3 and 4 which shows a shock absorber insert 14 configured to be mounted into the end of the lower shaft 3 of an aluminium crutch. A plug 15 is configured to be removably fitted into the end of the head 4 of the piston 5 to reinforce the head 4. The head 4 is removably fitted into a foot 16 configured to provide a contact surface of the assembled crutch with a ground surface. The foot 16 is made of a frictional and flexible material such as rubber.

The other components of the end mounted shock absorber insert 14, in the form of the piston 5, damper 10, cylinder sleeve 11, washer 12 and R-clip 13 are identical to the mid mounted shock absorber insert 1 shown in FIGS. 1 and 2. The cylinder sleeve 11 is frictionally fit into the lower end of the lower 3 shaft. Optionally the cylinder sleeve 11 may be fixed into the lower 3 shaft by adhesive.

The piston 5 and cylinder sleeve 11 are manufactured from moulded crystalline (glass injected) self-lubricating thermoplastic (acetyl resin). However, other rigid and lightweight materials could be used such as other plastics, carbon fibre, metal, metal alloy or composite material. The lightweight of the shock absorber insert improves ease of use of the walking aid incorporating the shock absorber insert 1, 14.

The dimensions of the shock absorber insert 1, 14 can be configured during manufacture for different diameter shafts of different walking aids. The minimum number of parts of the shock absorber insert 1, 14 keeps manufacturing costs to a minimum.

Figure 6:
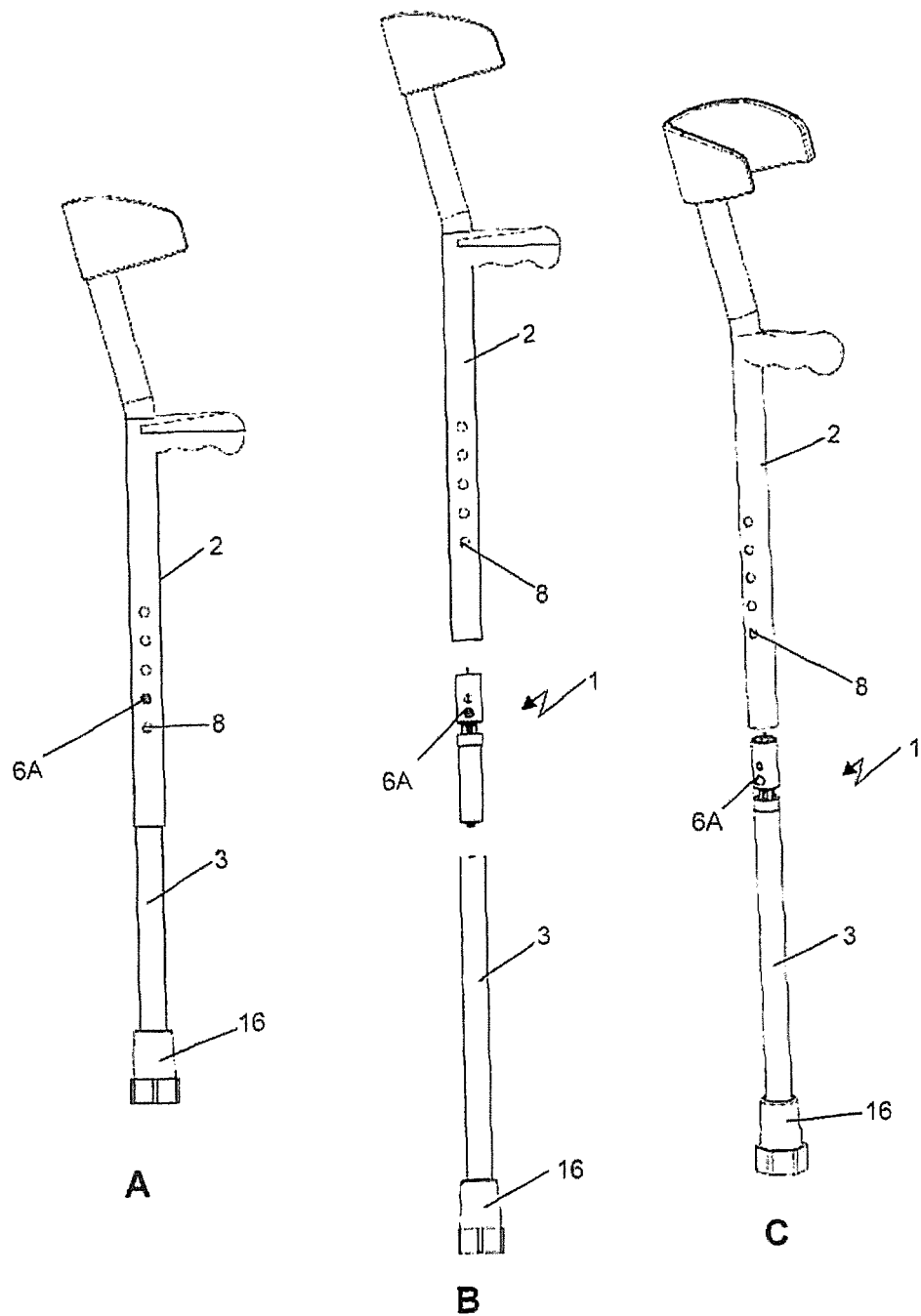
FIGS. 6A-C show steps in the fitting of the embodiment shown in FIG. 1 to an elbow crutch.
Figure 7:
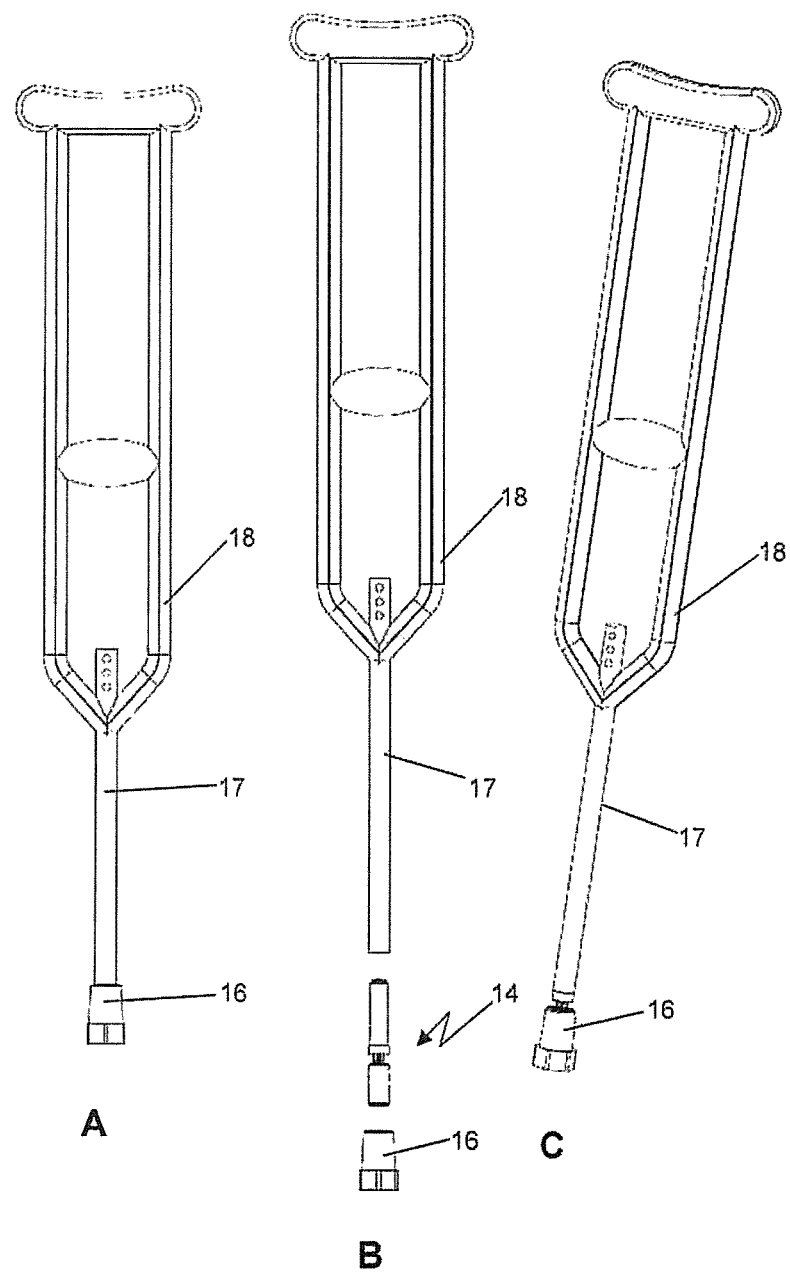
FIGS. 7A-C show steps in the fitting of the embodiment shown in FIG. 3 to an axilla crutch.
Figure 8:
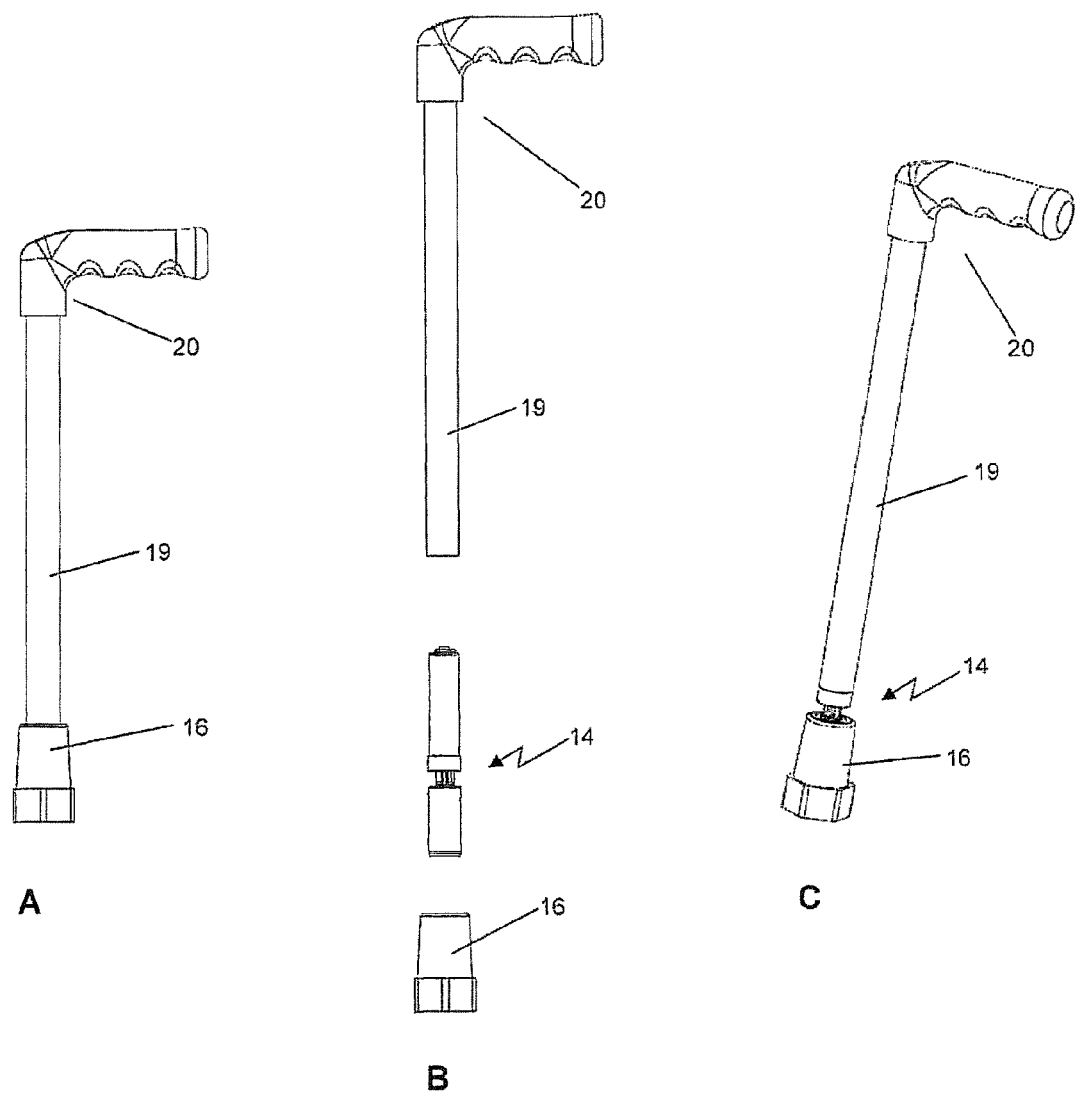
FIGS. 8A-C show steps in the fitting of the embodiment shown in FIG. 3 to a walking stick.

A user assembling the mid mounted shock absorber insert 1 (as shown in FIGS. 1, 2 and 6) in an existing crutch, from components supplied in a kit set, would follow the following method:

- disengage the upper 2 and lower 3 shafts (as shown in FIG. 6A);
- take out the nib spring 6 from the lower tubing nib spring hole 3A (as shown in FIGS. 1 and 2) in the lower 3 tubing shaft;
- locate the nib spring 6 in the holes 7A, B (depending on the size of the nibs 6A) of the head 4 of the piston 5;
- select the required damper 10 and locate on the lower rod portion 9B of the piston 5;
- locate the rod 9 in the cylinder sleeve 11 by inserting the lower rod portion 9B through aperture 11B in the end of cylinder 11 and secure the end of the lower rod portion 9B relative to the end wall 11A of cylinder 11 with washer 12 and R-clip 13;
- insert the cylinder sleeve 11 in the lower 3 shaft by friction fit (as shown in FIG. 6C); and
- insert the piston head 4 in the upper 2 shaft and locate the nibs 6A of the nib spring 6 to the required height holes 8 of the upper 2 shaft (as shown in FIG. 6C).

A user assembling the shock absorber insert 14 (as shown in FIGS. 3 to 5, 7 and 8) in the lower end of the lower shaft 3 of an elbow crutch would follow the following method:

- disengage the foot 16 from the lower end of the lower 3 shaft;
- select the required damper 10 and locate on the lower rod portion 9B of the piston 5;
- locate the rod 9 in the cylinder sleeve 11 by inserting the lower rod portion 9B through aperture 11B in the end of cylinder 11 and secure the end of the lower rod portion 9B relative to the end wall 11A of cylinder 11 with washer 12 and R-clip 13;
- insert the cylinder sleeve 11 in the lower 3 shaft (as shown in FIGS. 7B and 8B);
- insert the plug 15 into the head 4 of the piston 5; and
- insert the foot 16 over the head 4 of the piston 5 by friction fit (as shown in FIGS. 7C and 8C).

Alternatively the shock absorber insert 14 could be fitted into the lower end of the shaft 17 of an axilla crutch 18 (as shown in FIGS. 7B and C) or the lower end of the shaft 19 of a walking stick 20 (as shown in FIGS. 8B and C).

The two embodiments shown in FIGS. 1 and 2 and FIGS. 3 and 4 will lengthen the overall length of the crutch after installation. The mid mounted configuration shown in FIGS. 1 and 2 will extend the device slightly more than the bottom mount configuration shown in FIGS. 3 and 4. For taller persons this is an advantage as the crutch will be more useful in terms of increased length in the mid-mounted position. However, the crutch may be cut by the user (using a pipe cutter or saw) to alter the overall height of the crutch to fit the user or by using a crutch size that is shorter in overall length.

The method can be performed by the user quickly and safely. If no damping is needed by the user during use then the shock absorber insert 1, 14 can be removed from the walking aid (even during use for example where the nature of the ground surface changes) by a reversal of the above assembly procedures.

In this way, the user can self-adjust the damping rate of the assembled crutch by interchanging a different damper 10 (selected from weight guide of the instruction manual supplied with the kit) during assembly of the shock absorber insert 1, according to the users weight and/or comfort level. The need for professional specification by a doctor or physiotherapist is minimised. The damper 10 is manufactured from moulded crystalline (glass injected) self-lubricating thermoplastic (acetyl resin). However, other flexible and mouldable materials can be used. The different damper 10 shore hardness is indicated by different colours. Thus the damping performance of the assembled crutch can be adjusted depending on the weight of the user. For example, a damper with higher shore hardness would be preferred by a relatively heavier user to provide more support with less flexibility. In addition to altering the density of material, the design of the damper 10 may be varied depending on the shore hardness required. For example, the damper 10 can be solid, ribbed, concertinaed, air injected, or comprise at least one air cavity.

In addition, because attachment of the shock absorber insert 1, 14 to the body of the crutch as a self-contained unit does not affect the integrity of the support members of the crutch 2, 3 there is minimal danger of failure of the crutch during use. Further, as the shock absorber insert 1, 14 is fitted internally into the shaft of the walking aid further encasing and protecting the device, then safety is further improved by minimising obstruction to the user during use.

During use of the shock absorber insert 1, the piston 5 will stroke upwards and downwards inside the cylinder sleeve 11 as pressure is exerted onto and off the foot 16 of the crutch causing the damper 10 to compress and release as repetitive contact with a ground surface is made during the swing-through crutch-walk gait ambulation or walking manipulated by one arm. The shock absorber insert 1 is envisaged to have application to the sports rehabilitation and healthcare industries.

Preferred embodiments of the present invention have a number of advantages over the prior art which can include:

- improved ease of use in retrofitting the present invention to existing walking aids and without the use of tools unless the height of the original crutch is extended to the point where a user may cut the lower tubing (3) to adjust the effects of the lengthening of the overall crutch;
- improved safety of retrofitting the present invention to existing walking aids without affecting the integrity of the body of the walking aid;
- relative low cost to manufacture and purchase with a minimum of parts;
- streamlined design being an insert rather than attaching externally to the walking aid potentially damaging the thin aluminium tubing or causing obstruction to the user during use;
- self adjustable by the user through the interchanging of dampers with different shore hardness (not requiring specification by a doctor or physiotherapist); and
- lightweight resulting in improved manoeuvrability.

Aspects of the present invention have been described by way of example only and it should be appreciated that modifications and additions may be made thereto without departing from the scope thereof as defined in the appended claims.

What I claim is:

1. A shock absorber insert for a walking aid comprising:
   a piston cylinder configured to be removably fitted into an internal space of a first support member of a shaft of the walking aid by friction fit, the piston cylinder comprising an abutment surface;
   a piston rod configured to be removably fitted into an internal space of a second support member of the shaft of the walking aid and move axially within the piston cylinder; and
   a damper configured to be located on the piston rod and abut the abutment surface to reduce the speed of movement of the piston rod within the piston cylinder.

2. The shock absorber insert for a walking aid as claimed in claim 1 wherein the damper is interchangeable with a similar damper of different shore hardness.

3. The shock absorber insert for a walking aid as claimed in claim 1 wherein the piston cylinder and piston rod are configured to enable the damper to be interchangeable with a similar damper of different shore hardness.

4. The shock absorber insert for a walking aid as claimed in claim 3 wherein a portion of the piston rod is located within the piston cylinder with an attachment means.

5. The shock absorber insert for a walking aid as claimed in claim 4 wherein the attachment means is a clip configured to be inserted through an aperture in an end of the piston rod which projects through an end wall of the piston cylinder after insertion of the piston rod through the abutment surface of the piston cylinder.

6. The shock absorber insert for a walking aid as claimed in claim 5 wherein the clip is an R-clip.

7. The shock absorber insert for a walking aid as claimed in claim 1 wherein the damper is manufactured from a moulded material.

8. The shock absorber insert for a walking aid as claimed in claim 7 wherein the damper is manufactured from polyurethane.

9. The shock absorber insert for a walking aid as claimed in claim 1 wherein the shock absorber insert is configured to be removably fitted into a lower end of the support member which contacts a ground surface during use of the walking aid.

10. The shock absorber insert for a walking aid as claimed in claim 9 wherein the shock absorber insert is configured to be friction fitted within the lower end of the support member.

11. The shock absorber insert for a walking aid as claimed in claim 10 wherein the shock absorber insert also comprises a foot which is configured to contact the ground surface during use of the walking aid and be removably fitted on an end of the piston rod extending from the piston cylinder.

12. The shock absorber insert for a walking aid as claimed in claim 1 wherein the shock absorber insert is configured to be removably fitted between an upper and lower support member of the walking aid.

13. The shock absorber insert for a walking aid as claimed in claim 12 wherein the piston rod is configured to be reversibly fitted to the upper support member via a nib-spring located in at least one aperture of an upper portion of the piston rod and at least one aperture of the upper support member.

14. The shock absorber insert for a walking aid as claimed in claim 13 wherein the piston cylinder is configured to be removably fitted to a lower support member by friction fit.

15. A kit which can be readily assembled into a shock absorber insert for a walking aid comprising:
    a piston cylinder comprising an abutment surface;
    a piston rod configured to move axially within the piston cylinder;
    a damper configured to be located on the piston rod and abut the abutment surface and reduce the speed of movement of the piston rod within the piston cylinder; and
    an attachment means configured to locate the piston rod within the piston cylinder;
    wherein the piston cylinder is configured to be removably fitted into an internal space of a first support member of a shaft of the walking aid by friction fit and the piston rod is configured to be removably fitted into an internal space of a second support member of the shaft of the walking aid.

16. The kit as claimed in claim 15 wherein the damper is interchangeable with a similar damper of different shore hardness.

* * * * *